A. F. HINES.
Seed-Planter.
No. 29,937.  Patented Sept. 4, 1860.
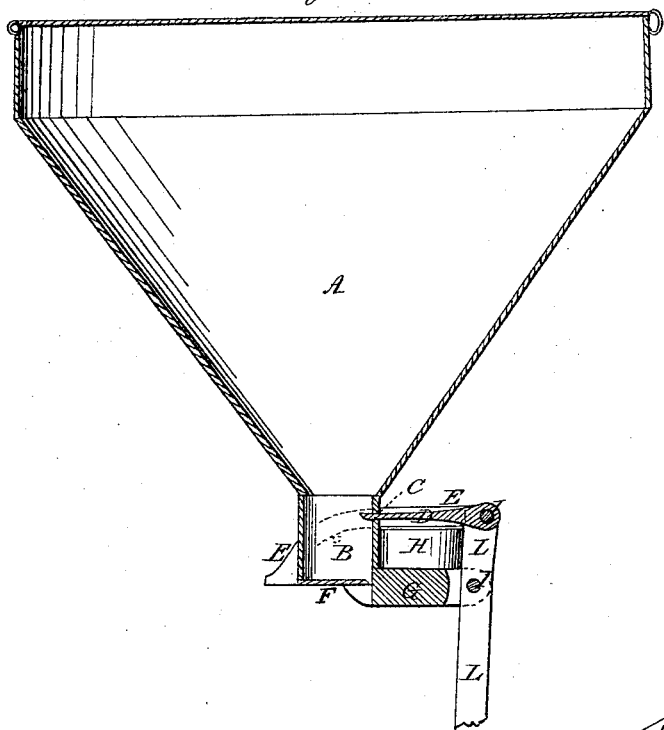
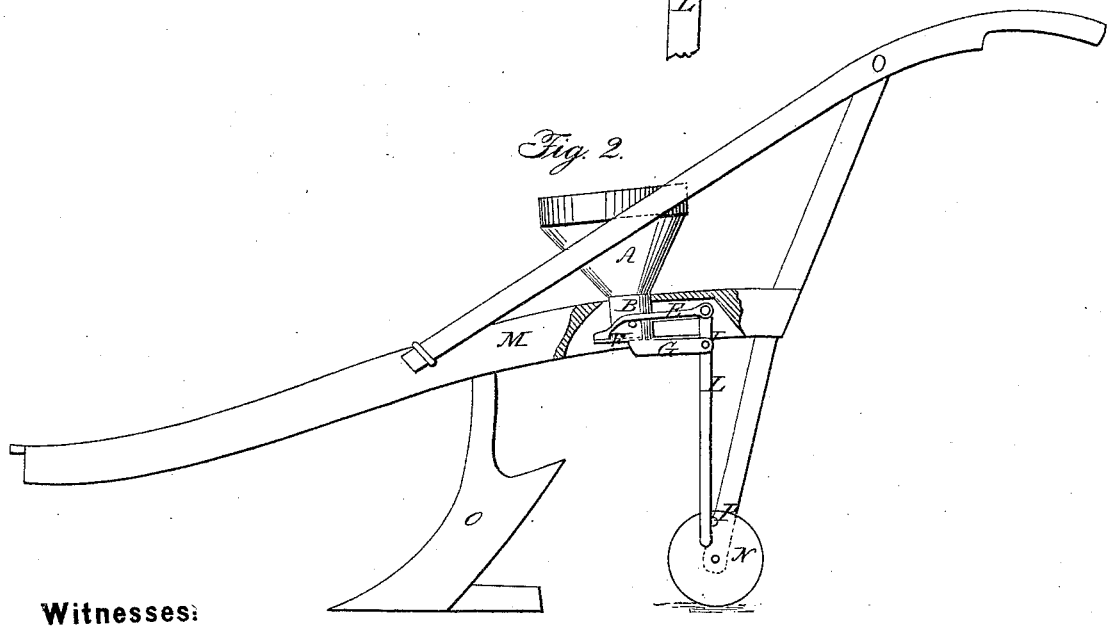

UNITED STATES PATENT OFFICE.

A. F. HINES, OF WASHINGTON, DISTRICT OF COLUMBIA, ASSIGNOR TO HIMSELF AND B. A. KIDDER, OF SAME PLACE.

IMPROVEMENT IN SEED-PLANTERS.

Specification forming part of Letters Patent No. 29,937, dated September 4, 1860.

*To all whom it may concern:*

Be it known that I, A. F. HINES, of Washington, in the District of Columbia, have invented a new and useful Improvement in Seed-Planters; and I do hereby declare that the following is a full, clear, and exact description of the same, reference being had to the accompanying drawings, forming a part of this specification, in which—

Figure 1 represents my improved device for planting corn and other seeds. Fig. 2 is intended to show how my planting device could be used in connection with a plow.

Similar letters of reference in each of the several figures indicate corresponding parts.

The nature of my invention consists in the arrangement of two reciprocating valve-slides, the surfaces of which are smooth and without recesses or perforations, in combination with an arm, lever, and spout, one valve working through an aperture in the side of the spout while the other valve works in contact with the under face of the spout, constructed in the manner and for the purposes hereinafter described.

To enable others skilled in the art to make and use my invention, I will proceed to describe its construction and operation.

The hopper A, arranged for the reception of the seed to be planted, terminates in a spout, B, from which extends a bracket, G. A lever, L, is pivoted to said bracket at J, and forked arm E, embracing the spout B, is pivoted to the upper end of lever L at I. The rear end of a slide-valve, D, is also pivoted to lever L at I, while its front edge passes through a slot, C, in the side of the spout B. Another slide valve is placed against the bottom part of spout B, and is attached to the outer end of arm E. On working the lever L so as to throw the upper end of it toward the spout the valve D will be moved forward through slot C, so as to close up the top part of the spout, while the lower valve, F, will be withdrawn, so as to open the lower end of the spout and allow the seeds to pass out. On throwing back the upper end of lever L the upper valve, D, will withdraw from the spout and the valve F will close the lower end of the spout, ready for supplying the spout with seed from the hopper. The spring H between the spout and lever serves to return the latter to its original position as soon as it is let go.

The above-described seed-planter may be connected with a plow, O, if desired, and the lever L be worked by means of an eccentric pin, or in any other suitable manner.

This is a very simple arrangement, the main advantage of which is that the valves are smooth and without recesses or perforations, which latter are always liable to be clogged by any undue accumulation of seeds. The whole device is very simple and not liable to get out of order, the lever, arm, and two valves being all the movable parts of my seed-planter.

What I claim as my invention, and desire to secure by Letters Patent, is—

The arrangement of two reciprocating valve-slides, D F, the surfaces of which are smooth and without recesses or perforations, in combination with an arm, E, lever L, and spout B, one valve working through an aperture, C, in the side of the spout, while the other valve, F, works in contact with the under face of the spout, constructed in the manner and for the purposes set forth.

A. F. HINES.

Witnesses:
  GOODWIN Y. AT LEE,
  R. W. FENWICK.